July 5, 1938.  E. G. WIEMER  2,122,766
AERIAL BANNER
Filed July 21, 1937  4 Sheets-Sheet 1
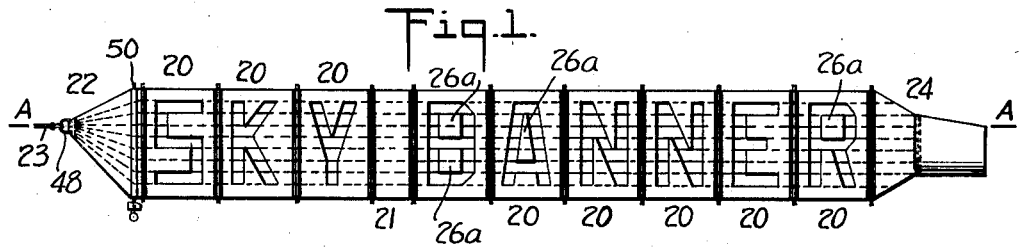
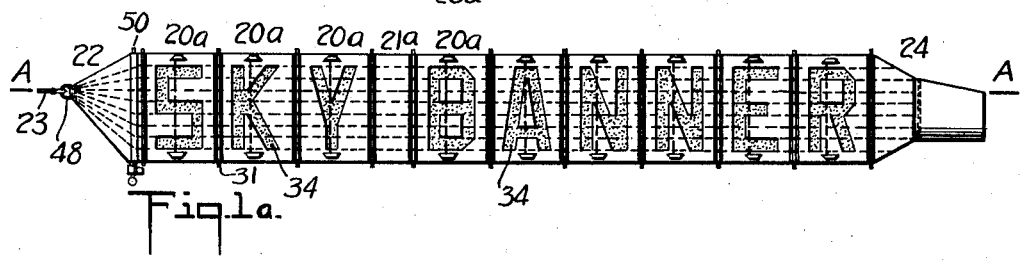
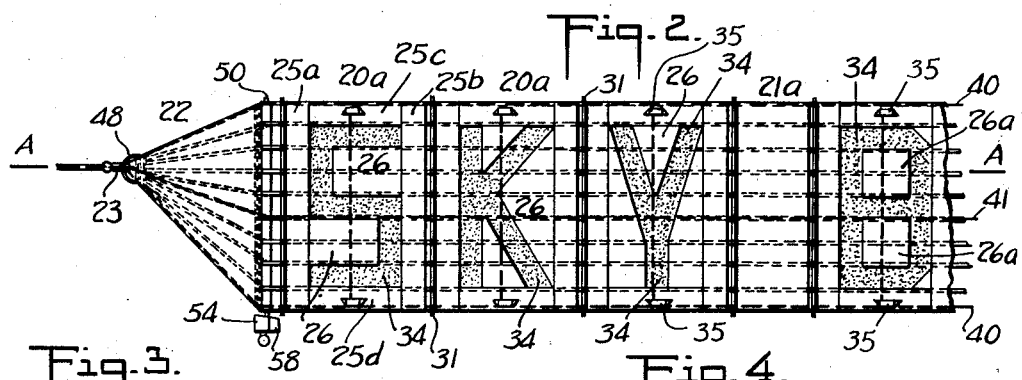
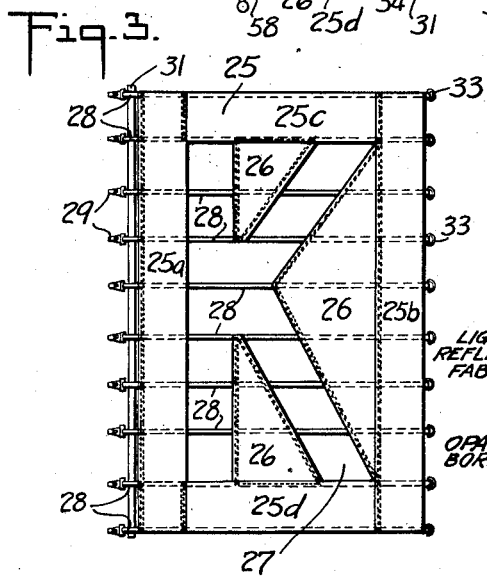
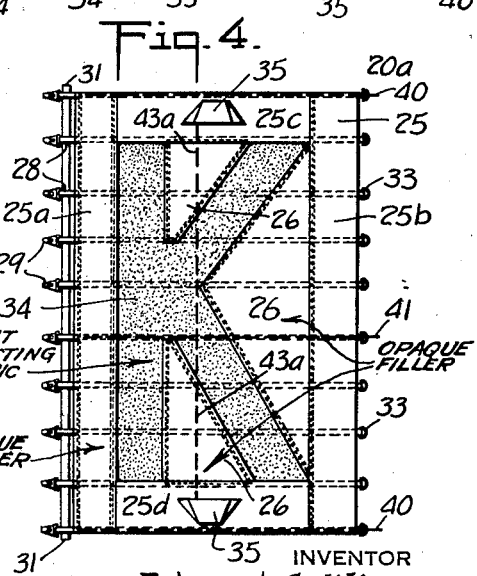
INVENTOR
Edward G. Wiemer
BY
ATTORNEY

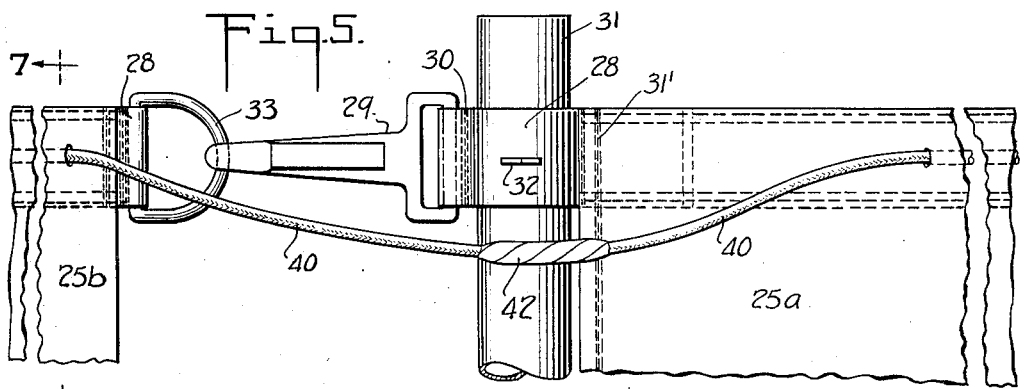
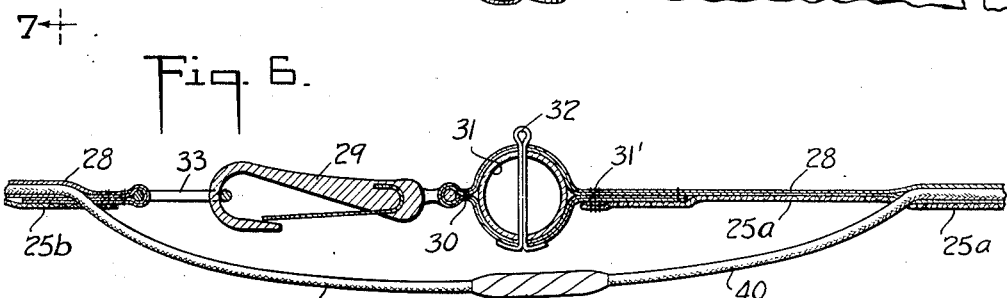
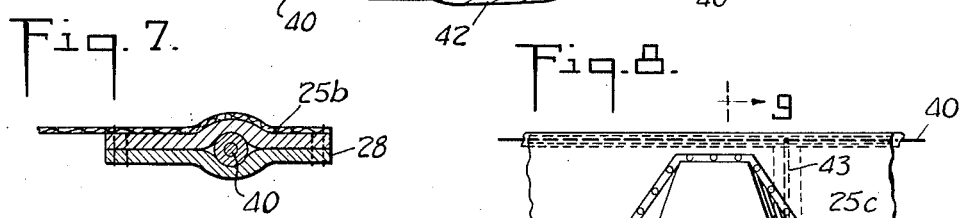
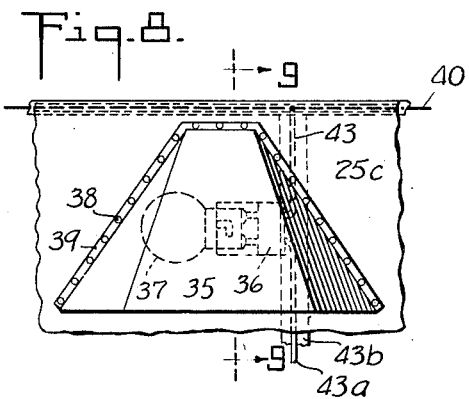
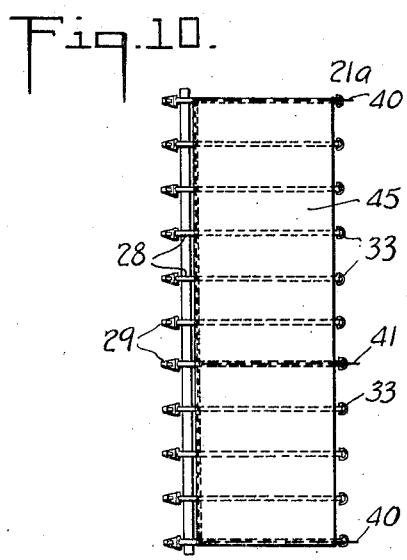
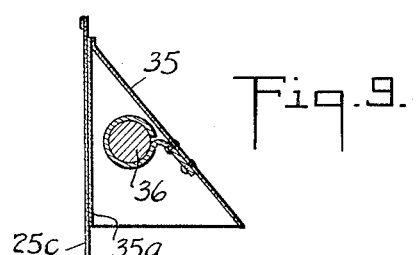

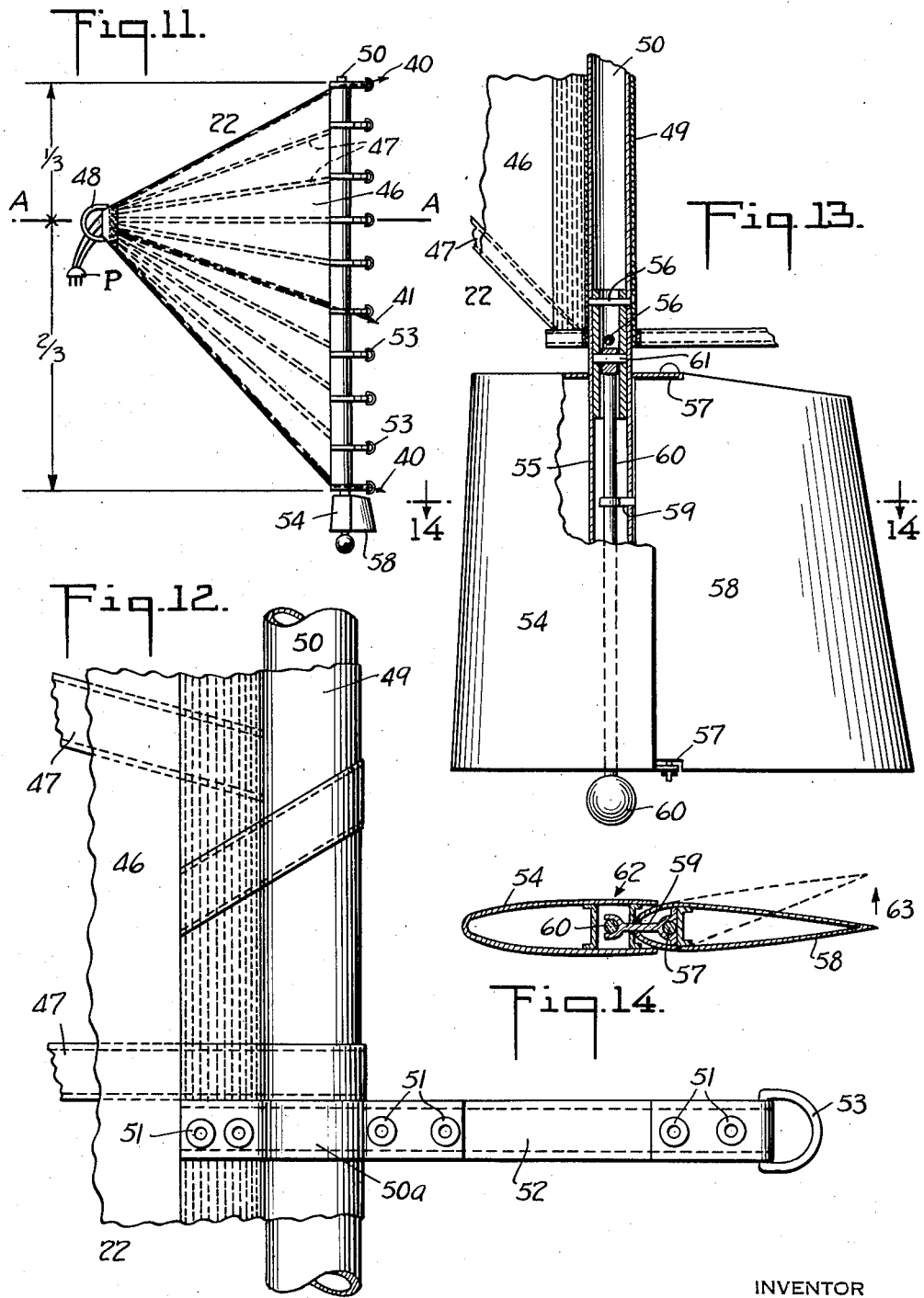

July 5, 1938. E. G. WIEMER 2,122,766
AERIAL BANNER
Filed July 21, 1937 4 Sheets-Sheet 4
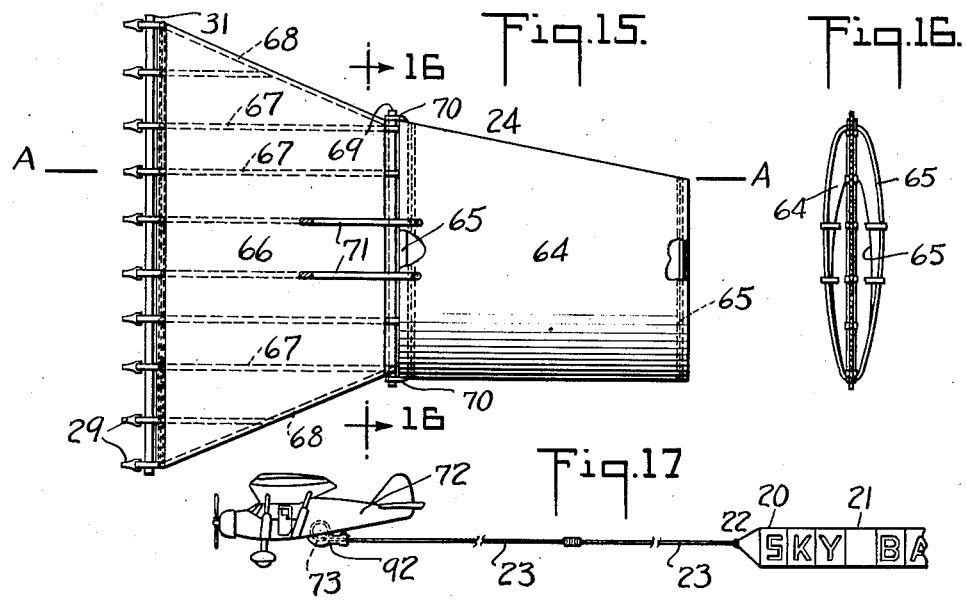
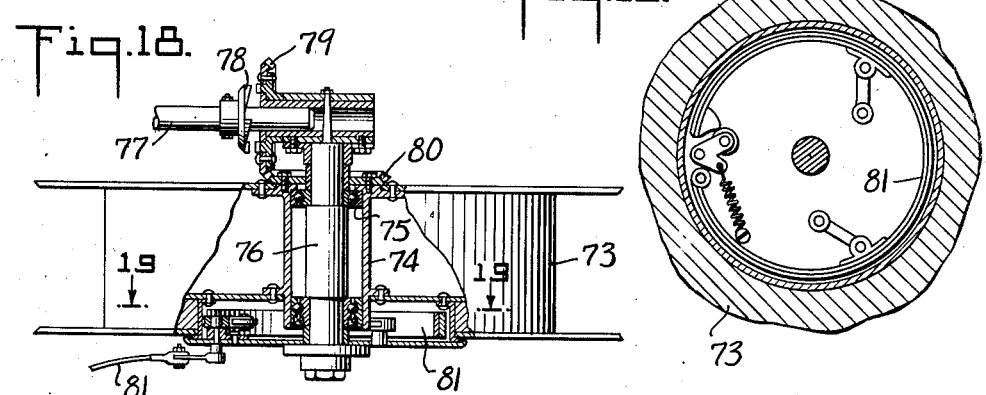
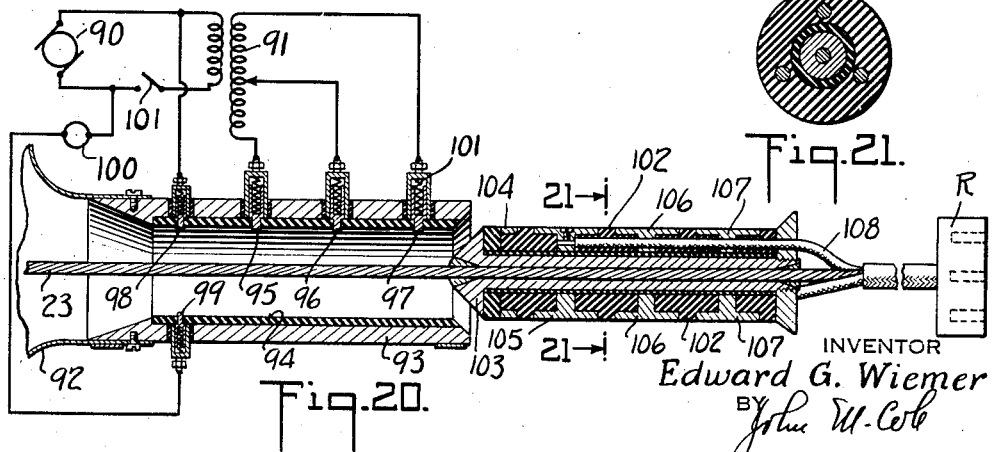
INVENTOR
Edward G. Wiemer
BY
ATTORNEY Patented July 5, 1938

2,122,766

UNITED STATES PATENT OFFICE 2,122,766

AERIAL BANNER

Edward G. Wiemer, Lynbrook, N. Y.

Application July 21, 1937, Serial No. 154,713

34 Claims. (Cl. 40—127)

This invention relates to aerial advertising devices and pertains particularly to sky advertising banners designed to be towed by aircraft.

In connection with such banners, it is desirable to provide a structure wherein the banner is generally characterized by huge display characters such as letters, numerals, trade-marks, symbols or the like which in the aggregate portray an advertising message or display, and preferably are adapted to be illuminated for exhibition at night.

Many problems are presented in the provision of a practical and aerodynamically efficient banner. One of the factors involved is the weight-strength ratio of the banner and associated operating equipment. Another factor is the certainty of operation of the power plant for the illuminating system and the matter of breakage of the electric lamp bulbs used. Also the adaptability of the device to permit changing the advertising message or display in a short time, is a determining factor of economic practicability and usefulness.

Heretofore various arrangements have been proposed for night flying banners, but none of them has achieved a high degree of popularity. The arrangements with which I am familiar have been difficult and impractical to attach, or unreliable, or employ an apparatus which lacks stability to maintain the display matter in such position as to be effectively displayed under the varying weather conditions to be encountered. In carrying into actual practice the principles of my invention, however, I have developed and produced means to overcome such disadvantages.

One object of my invention is to provide a sky advertising banner embodying a plurality of interchangeably connectible display character units which are constructed from flexible light absorbing material which forms an opaque background delineating the display characters, so that the sky brightness will appear in marked contrast with the background fabric when the banner is being towed. Such characters are clearly readable against the sky from distant points in the day time.

A further object is to provide a sky advertising banner embodying a plurality of interchangeably connectible display character units which are constructed from flexible light absorbing and light reflecting materials, and which are adapted to be illuminated by a plurality of electric lamps for exhibition at night.

A further object is to provide for the banner a bridle unit having associated therewith, as an integral part thereof, aerodynamic stabilizing means to facilitate the banner being towed through the air in a generally vertical plane, exhibiting the display characters standing upright, and the writing-line horizontal, regardless of weather conditions and the speed at which the banner is being towed.

A further object lies in the provision of a combined trailing-end stabilizing and lifting unit for the banner, said unit being detachably connectible to the rear-most display character unit, and being calculated to reduce oscillation, flutter, wear and drag to the lowest degree possible, and to maintain the display characters in a vertical plane, and the writing-line in a horizontal position throughout the entire length of the banner.

Where a banner is to be towed behind an airplane the tow cable must be long enough to provide for take-off of the plane. The usual length of such cable is four hundred feet. After the banner is in the air the pilot may draw it up closer to the plane, so that the banner is about one hundred feet behind the plane.

Where an electrically lighted banner is used the power plant is carried in the ship, and may be an engine driven generator or an isolated gasoline engine driven generator. Wiring connections are made by wires carried by the cable. The present invention contemplates employing a cable with wiring extending forwardly from the banner only part of its length and having a connector (such as a plug) secured to the front end of the wires and to the cable, and the provision of the ship with a co-operative connector (such as a receptacle) connected to the power source, and with a wind-up drum whereby the cable may be wound up to an extent to bring the connectors together. The arrangement just referred to reduces the amount of wire required and hence reduces the weight and cost of the tow cable and the resistance losses in the leads. With a two wire system the saving may be about 600 feet of wire, and in a three wire system (which is preferred) the saving is 900 feet of wire.

Other objects and advantages will be apparent as the description proceeds, reference now being had to the figures of the accompanying drawings forming a part of this application and wherein like reference characters indicate like parts.

In the drawings:

Figures 1 and 1a are side elevations showing at small scale, a day banner and a night banner;

Figure 2 is an enlarged side elevation of a portion of the night banner;

Figure 3 is an enlarged side elevation of a display character unit, or section for a day banner, and which may be made into a section for a night banner;

Figure 4 is an enlarged side elevation of a display character unit or section adapted for exhibition at night, and showing, diagrammatically, the method of arranging the electric illuminating means upon such unit;

Figure 5 is an enlarged broken, partial side elevation illustrating the details of the devices for securing two adjacent units or sections of the banner together;

Figure 6 is a horizontal cross section through Figure 5;

Figure 7 is a vertical cross section in the line 7—7 of Figure 5 illustrating the location of the wire leads;

Figure 8 is an elevation of a lighting unit and showing adjacent supporting fabric;

Figure 9 is a cross section on line 9—9 of Figure 8;

Figure 10 is an enlarged side elevation of a spacer unit;

Figure 11 is an enlarged side elevation of the bridle unit;

Figure 12 is an enlarged fragmentary side elevation of a portion of the bridle unit illustrating the securing of the stabilizing tube and the anchoring straps together;

Figure 13 is an enlarged side elevation of the aerodynamic stabilizing device, partly in section;

Figure 14 is a cross section on the line 14—14 of Figure 13;

Figure 15 is an enlarged side elevation of the combined trailing-end stabilizing and lifting unit, partly in section;

Figure 16 is a cross section on the line 16—16 of Figure 15;

Figure 17 is a side elevation of an aircraft having a banner in tow;

Figure 18 is a horizontal sectional view of a wind-up mechanism;

Figure 19 is a side elevational inside view of the brake assembly of the wind-up mechanism;

Figure 20 is a longitudinal sectional view through the plane-carried receptacle and the cable-carried plug for effecting connection between the generator and the banner; and Figure 21 is a section on the line 21—21 of Figure 20.

With reference to Figures 1, 1a and 2, it will be observed that the display character units or sections 20 or 20a are assembled for the formation of words, numbers, etc., which in turn are interconnected by the spacer units 21 or 21a so as to portray an advertising message or display. At the front end, the section depicting the first display character of the banner is detachably connected to the bridle unit 22 to which the adjacent or rear end of the combined tow and electric cable 23 is detachably secured, while at the opposite end the combined trailing-end stabilizing and lifting unit 24 is detachably connected to the rearmost display character unit.

The display character units are of generally rectangular outline and all the sections of a particular banner are constructed the same way. The details of a section for a day banner appear in Figure 3. A rectangular frame indicated generally as 25 is constructed from dark colored fabric. This frame, it will be noted, comprises a plurality of strips 25a, 25b, 25c and 25d, which are joined together by stitching. Suitably positioned at and stitched to the inner top, bottom and side edges of said frame, respectively, and extending toward the middle of the unit, are an appropriate number of suitably shaped dark colored fabric fillings 26. These fillings are so spaced apart that the open space formed between them and the frame, respectively, portrays a display character 27, which, in this instance, is the letter K. Extending across said frame and said fillings in binding relation and stitched thereto throughout the whole of their common extent at the back of the unit are a plurality of horizontal parallel spaced flat canvas re-enforcing tapes 28, the ends of which extend beyond the outer front and rear edges of the frame. In instances where a display character such as an alphabetical letter A, B, R (see Figure 1) or the like is to be formed, one or more suitably shaped dark colored fabric fillings 26a are suitably positioned and are stitched throughout their common extent to the re-enforcing tapes 28 in order to form such a display character. At the front or leading edge of the section (see Figures 3, 5 and 6) each re-enforcing tape 28 is preferably made two ply and is provided with a snap-hook 29 secured by lock-stitching, as shown at 30 (Figures 5 and 6), and a leading-edge tube 31, preferably of light and resilient metal such as aluminum alloy and provided for each unit as an integral part thereof, is embraced by each tape in an obvious manner (as by stitches 31') and is locked to the top and bottom tapes, respectively, by cotter pins 32. At the rear or trailing edge of the section each tape is equipped with a D-ring 33 serving to engage a corresponding snap-hook of an adjacent unit for detachably connecting the separate units of the banner one to the other, so that the entire banner body may be assembled to carry the desired legend.

By constructing the display character units as shown in Figure 3, one obtains a banner with stencil-like holes or openings as shown in Figure 1 and can utilize the sky for a background when the banner is being towed. Obviously, a banner embodying this type of units may be used effectively during the day time, the display characters being distinctly outlined against the sky and clearly readable from distant points by observers on the ground.

Where the banner is intended to be applicable for day as well as night exhibition, I prefer to employ a slightly modified form of display character units 20a. These may be made from units adapted for sky lighted display characters. Such a section unit is shown in Figure 4, where it will be observed that the open space of the sky-light display character is filled in by a display character 34 constructed from flexible light colored more or less translucent material having a high coefficient of reflection, such as metal fabric or the like. This fabric is stitched to the frame 25, to the fillings 26, and to the re-enforcing tapes 28, respectively. These metal fabric display characters are in startling contrast to the surrounding dark colored background afforded by the frame and fillings, and are clearly legible from distant points in the day time, and also at night when illuminated by a plurality of electric lamps.

Disposed at the top and bottom, respectively, of each display character unit 20a, and secured to the rectangular frame 25 are one or more reflectors 35 (see Figures 2 and 4) within each of which is suitably secured, as shown in Figures 8 and 9, an automotive, bayonet base type, lamp socket 36 carrying a lamp bulb 37. Holes 38 are made in the flange of each reflector and attachment is effected by stitching or lacing, as at 39 (Figure 8). It will be noted with reference to Figures 2, 4, 8 and 9, that the position of the reflectors 35 is such that practically all of the light flux from the lamp bulbs 37 is directed upwardly and downwardly along the surface of the banner and against the display character. The efficiency of the reflectors is greatly intensified by stitching a suitably shaped piece of metal fabric 35a to the fabric frame part 25c or 25d, as indicated in Figure 9, said piece of metal fabric constituting the back of the reflector.

In order to attain a substantially uniform efficiency of the illuminating system regardless of the length of the banner or, in more detailed terms, a greater or less number of display character units constituting the advertising message or display, a supply circuit of the balanced three-wire type has, in practice, proved to be the most satisfactory arrangement. As illustrated, diagrammatically, in Figure 4, each display character unit 20a carries a length 40 of the outside circuit wires and a section 41 of the neutral wire, all of which are enclosed within the corresponding hollow tubes formed, as shown in Figure 7, by stitching together the two plies of re-enforcing tapes 28. The ends of these wires are brought out to the front surface of the banner, so as to be off the ground during take off, and are secured to the corresponding wires of adjacent sections in any suitable manner. Simple taped joints 42 may be used. The sockets 36 are connected to the outside supply circuit live wires 40 by wires 43 and to the neutral wire 41 by wires 43a. Wires 43 and 43a are enclosed within the hollow seams formed by stitching flat canvas tape 43b at the back of the unit (see Figure 8).

The spacer units 21 are provided for separating words, or a combination of words and numbers, or other display characters of the advertising message or display to facilitate legibility. These spacer units are generally similar in construction to the display character units before described. As shown in Figure 10, each unit comprises a plain dark colored fabric sheet 45 to which is stitched throughout the whole of their common extent, at the back of the unit, a plurality of horizontal parallel spaced flat canvas re-enforcing tapes 28 which here also carry snap-hooks 29 and rings 33. The unit also carries a leading edge tube 31, and by reference to the drawings it will be obvious that attachment of the spacer unit 21 is effected by the same method already described in connection with the display character units. It will be further noted with reference to Figure 10, that the spacer unit 21a, carries a length of the outside wires 40 and of the neutral wire 41. They are also enclosed within the corresponding hollow seams formed by stitching the re-enforcing tapes 28 together.

Detachably connected to the first display character unit is the bridle unit 22 (see Figures 1, 1a, 2 and 11). This unit is of an oblique angled triangular shape for a purpose to be subsequently described. As shown in Figure 11, it comprises a dark colored fabric sheet 46 which is re-enforced with a plurality of converging, flat, two ply, canvas tapes 47, stitched to the sheet throughout the whole of their common extent, at the back of the unit. At its left-hand or forward end the unit is provided with a D-ring 48 while at the right hand end a tubular hem is formed, as at 49 (see Figure 12), within which is suitably secured a tube 50, preferably of light and resilient metal such as aluminum alloy. Embracing the tubular hem, as at 50a, Figure 12, and secured to the sheet 46 and the tube 50 by tubular rivets 51, are a plurality of spaced canvas tape anchoring straps 52, each of which is provided with a D-ring 53 also secured by tubular rivets 51 and serving to engage a corresponding snap-hook 29 of the adjacent or first display character unit upon assembly of the banner. The upper and lower tapes 47 carry wires 40 for the outside wires of the three wire system, while an intermediate tape carries a wire 41 for the neutral wire, so as to be connectible to the wires of the banner sections. The front ends of the wires of the bridle section are connected to a plug P adapted to co-operate with a receptacle R carried by the rear end of the tow cable 23.

From the foregoing it is obvious that the separate units of the banner are hooked one to the other while the sections of the supply circuit wires are connected together by means of the taped joints. Consequently the display character units 20a and the spacer units 21a are freely interchangeable. Any word or combination of words, or any combination of words and numbers, symbols, trade-marks or the like may be portrayed through a proper selection of units, and the number of units constituting the advertising message or display may be varied as desired. Moreover, through the provision of the leading edge tube 31 as an integral part of each unit, each unit is, in flight, presented in a smoothly stretched form, whereby the longitudinal as well as the transverse stresses imposed upon the banner are substantially uniformly distributed over its entire surface, and whereby flutter, ripple, wear and drag are substantially reduced, thus insuring aerodynamic efficiency as well as a long life of the banner.

In its broad aspect the bridle unit is the controlling stabilizing element of the banner to facilitate the same being towed in a generally vertical plane, exhibiting the display characters standing upright, and the writing-line horizontal, so that the advertising message or display may be easily read from a distance by observers on the ground. Particular emphasis is placed on its oblique angled triangular shape whereby the position of the D-ring 48 is located at approximately one third 1/3 (Figure 11) of its height below the line designating the top edge of the banner. With particular reference now to Figure 1, it will be apparent that by this method the longitudinal axis of balance A—A of the banner as a whole is suitably low located, so that the tension stresses imposed upon the banner in flight are substantially uniformly distributed throughout its height.

It is also a known fact that, in flight, any sky advertising banner is subject to the influences of air currents which, at intervals, cause such banner more or less to oscillate about its longitudinal axis of balance. Inasmuch as it is desirable to constantly present the banner in a generally vertical plane, as before outlined, it is necessary to check such oscillations. For this purpose I provide the bridle unit with aerodynamic stabilizing means which are lighter in weight and more effective than the common weights heretofore more or less extensively used in connection with banners, and impart directional control thereto in such a manner as to directly dampen oscillations. As shown in Figures 11, 13 and 14, an airfoil 54, preferably made of light weight sheet metal such as aluminum alloy, is secured to the lower end of the tube 50 by means of a member 55 secured in place by rivets 56. Suitably hinged to this airfoil, as at 57, and also constructed from the aforesaid material, is a second airfoil or rudder 58 provided with an arm 59, the forked end of which straddles a pendulum 60, which is pivotally secured to the member 55 by a pin 61.

Viewing the banner for instance from the front end, it is obvious that upon inclination of the bridle unit for instance in a clockwise direction, the pendulum will exert a torque on the arm 59 (see Figure 14) in the direction of the arrow 62, about the hinge axis 57, thus urging the rudder 58 to the left, as indicated by the arrow 63. The air pressure now exerted upon the left hand side of the rudder then causes an erecting torque about the longitudinal axis of balance A—A (see Figures 1 and 11), such torque being transmitted through the tube 50. If, however, the bridle unit becomes inclined in the opposite direction, the pendulum 60 exerts an opposite torque on the arm 59, thereby urging the rudder 58 to the right, whereupon the air pressure now exerted upon the right hand side of the same causes an opposite erecting torque about the longitudinal axis of balance A—A. The fixed and movable airfoils co-operate to effect the erection of the banner and do not develop any tendency for the entire banner to roll about its horizontal axis. It will thus be clear that by imparting gravitational, or rather pendulum, control to the rudder 58, any oscillations set up by air currents are instantly and effectively damped by direct reduction of inclination.

Experiments have shown that the bridle unit constructed as described above, in and of itself, and by reason of the low location of the longitudinal axis of balance A—A and the function of the pendulum controlled rudder 58, always maintains the banner in a generally vertical plane so as to present the display characters standing upright, and the writing-line horizontal, throughout its entire length, regardless of weather conditions and the speed at which the banner is being towed. The undesirable pendulum effects, due to a too highly located longitudinal axis of balance and to the non-uniform distribution of the tension stresses resulting from the disturbed balance and stability of previously existing sky advertising banners, have been eliminated.

Detachably connected to the rearmost display character unit is the combined trailing-end stabilizing and lighting unit 24 (see Figures 1, 1a, 15 and 16). Referring to Figures 15 and 16, the stabilizing and lifting element of this device is a tubular air channel 64, which is preferably made of light weight fabric and provided at each end with an elliptical shaped metal frame 65, and which is substantially tapered in such a manner that, in flight, its top surface is arranged at a positive angle of incidence with respect to the line of thrust and the longitudinal axis of balance A—A of the banner. The frames 65 are preferably formed from aluminum alloy tubing, used in preference to sheet metal or wire to take advantage of the light weight and the increased resistance to bending. Extending forwardly from said air channel 64 is a fin 66 which is preferably constructed from dark colored fabric and re-enforced with a plurality of horizontal, spaced flat canvas tapes 67, while additional strips 68 of such tape extend along and re-enforce its top and bottom edges. Suitably secured within a tubular hem formed in an obvious manner at the trailing-edge of said fin is a tube 69, preferably of light weight metal, such as aluminum alloy, and provided adjacent each end with holes (not shown) to facilitate attachment of the front end frame 65 of the air channel by lacing with a strong waxed cord, as at 70. Also suitably secured to the fin 66 and the front end frame 65, respectively, are the converging canvas tape straps 71, whereby, in flight, the front end or mouth of the air channel is held against the air stream. At the front end, each canvas tape 67 and 68 embraces a leading-edge tube 31, preferably also of aluminum alloy, and is provided with a snap-hook 29 serving to engage a corresponding D-ring of the adjacent or rearmost display character unit.

It has been found by experience that, in flight, a substantial quantity of the air flowing along the surface of the banner passes through the air channel 64, whereby, by reason of the pressure exerted upon its inclined top surface, a certain amount of lift is produced to prevent sagging of the trailing-end portion of the banner. Consequently the banner is always presented in a longitudinally extended position, with the writing-line being horizontal, throughout its entire length. Furthermore, due to the dampening reaction induced by the air flowing through said air channel, oscillation, flutter wear and drag are substantially reduced to insure increased stability and aerodynamic efficiency.

For towing the banner, any type of aircraft, such as an airplane, an autogiro, a dirigible or the like, may be employed. For reasons which subsequently will be apparent it has been found advisable, in each instance, to provide the aircraft 72 (see Figures 17 and 18) with a winding drum 73 which is conveniently mounted inside the body in such a manner as to partly project through the bottom thereof, and which, in each instance, is located a suitable distance behind the center of gravity, so that, in flight, the balance of the aircraft will not be disturbed by the drag of the banner. The drum 73 is rotatably supported on ball bearings 75 carried by a fixed shaft 76. The drum 73 is rotated by a hand operated shaft 77 adapted to be drivingly connected by a clutch 78 with a gear train including the gears 79 and 80. The winding drum is adapted to be locked against movement by a brake mechanism, indicated at 81, which may be similar to the brake mechanism used in a landing wheel.

The electric current for illuminating the banner is supplied by an electric generator diagrammatically indicated in Figure 20 at 90. This generator is preferably an alternating current generator, and may be engine driven, or wind driven, but is preferably operated by a separate gasoline engine. Its output may be regulated automatically or manually. For simplicity, the usual controls and instruments are omitted from the drawings. The generator is connected to a transformer 91 having a three wire output circuit of preferably 240–120 volts. Instead of an alternator and transformer it is possible to use two direct current generators in series with the common point as neutral in the three wire system.

Disposed adjacent the winding drum 73 is a fixedly secured metal fairing 92 which carries a tubular contact carrying sleeve 93 provided with an insulating lining 94 and insulated contacts 95, 96, 97 connected to the output side of the transformer 91 and contacts 98 and 99 connected to the generator through a signal lamp 100. These contacts are pressed inwardly by springs 101.

The tow cable 23 extends through the fixed contact carrying member and, at a suitable distance from its rear end, carries a plug 102 adapted to co-operate with the fixed member. This plug has a metal center 103 provided with a conical front end and carries four spaced insulated contact rings 104, 105, 106 and 107. The three rear rings are preferably elongated and each is connected with a wire, such as 108, leading back to the receptacle R at the end of the tow cable. When the cable is wound up the ring 104 makes contact with the fixed contacts 98 and 99 to light the lamp 100 and signal the operator that the brake 81 should be applied. At this time the circuit from the generator to the banner is completed and the lamps of the banner may be lighted by closing a control switch 101. It is obvious that with this arrangement the length of the electric circuit and the voltage drop are reduced to an extent to permit effectively operating a greater number of lamps (or rather a greater number of display character units) and avoid dimming the lamps at the trailing end portion of the banner. There is also considerable saving in weight and cost.

Prior to landing, or when the aircraft is in danger, the pilot disengages the drive jaws and the brake, thereby permitting the combined tow and electric cable to unwind and release itself from the roller and allowing the banner to drop to the ground, breaking of the lamps being prevented by the reflectors.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

What I claim is:

1. In an aerial banner, a section of rectangular shape adapted to display a character, comprising a spacer bar, a plurality of spaced parallel stringer members secured to the spacer bar, and opaque fabric elements secured to the stringer members throughout the whole of their common extent, the fabric elements occupying a portion of the area of the section and being disposed on the stringer members to form an opaque background delineating the character.

2. An aerial banner section such as claimed in claim 1, wherein the background includes a border formed of transverse strips of fabric extending across and stitched to all the stringer members and disposed at the leading and trailing ends of the section, and longitudinally-extending strips of fabric stitched to the upper two and to the lower two stringer members respectively and extending between the transverse strips of fabric.

3. An aerial banner section such as claimed in claim 1, wherein the background includes a border formed of transverse strips of fabric extending across and stitched to all the stringer members and disposed at the leading and trailing ends of the section, and longitudinally-extending strips of fabric stitched to the upper two and to the lower two stringer members respectively and extending between the transverse strips of fabric, and filler elements stitched to the stringer members and occupying a part of the rectangle defined by the border.

4. In an aerial banner, a section adapted to display a character, comprising a spacer bar, a plurality of spaced parallel stringer members secured to the spacer bar, opaque fabric elements secured to the stringer members throughout the whole of their common extent and disposed thereon to form an opaque background delineating the character, and light reflecting cloth stitched to the stringer members and to the background and filling in the area not occupied by the background.

5. In an aerial banner, a section adapted to display a character, comprising a spacer bar, a plurality of spaced parallel stringer members secured to the spacer bar, opaque fabric elements secured to the stringer members throughout the whole of their common extent and disposed thereon to form an opaque background delineating the character, light reflecting cloth stitched to the stringer members and to the background and filling in the area not occupied by the background, and light units disposed adjacent the upper and lower stringer members on the face of the section and provided with reflectors to direct light toward the light reflecting cloth.

6. In an aerial banner, a section adapted to display a character, comprising a spacer bar; a plurality of spaced parallel stringer members secured to the spacer bar; an opaque background which includes a border formed of transverse strips of fabric extending across and stitched to all the stringer members and disposed at the leading and trailing edges of the section, longitudinally-extending strips of fabric stitched to the upper two and to the lower two stringer members respectively and extending between the transverse strips of fabric, and one or more stitched in filler elements disposed to delineate the character; and a light reflecting fabric stitched to the filler members and to the background and filling the area not occupied by the background.

7. An aerial banner section such as claimed in claim 6, having lighting units secured to the longitudinally-extending strips of fabric and provided with reflectors to direct light toward the light reflecting fabric.

8. An aerial banner section such as claimed in claim 6, having current supply wires carried by certain of the stringer members and lighting units secured to the face of the section for illuminating the light reflecting fabric.

9. In an aerial banner, a section of rectangular shape adapted to display a character, comprising an opaque background of fabric occupying a portion of the area of the section and delineating the character, and a plurality of longitudinally-extending fabric stringer members stitched to the background throughout the whole of their common extent.

10. In an aerial banner, a section adapted to display a character, comprising an opaque background of fabric delineating the character, a plurality of longitudinally-extending fabric stringer members stitched to the background throughout the whole of their common extent, and light reflecting fabric stitched to the stringer members and to the background and filling the area not occupied by the background.

11. In an aerial banner, a section adapted to display a character, comprising an opaque background of fabric delineating the character, a plurality of longitudinally-extending fabric stringer members stitched to the background throughout the whole of their common extent, light reflecting fabric stitched to the stringer members and to the background and filling the area not occupied by the background, and lighting units secured to the background for illuminating the filling.

12. In an aerial banner, a section adapted to display a character, comprising an opaque background of fabric delineating the character, a plurality of longitudinally-extending fabric stringer members stitched to the background throughout the whole of their common extent, light reflecting fabric stitched to the stringer members and to the background and filling the area not occupied by the background, lighting units secured to the background adjacent the upper and lower stringer members, a current supply wire carried by the upper and lower stringer members and connected to the adjacent lighting unit, and a neutral wire carried by an intermediate stringer member and connected to both units.

13. In an aerial banner, a section adapted to display a character, comprising a plurality of parallel stringer members, an opaque background of fabric stitched to the stringer members throughout the whole of their common extent, a light reflecting fabric stitched to the stringer members and to the background and filling the area not occupied by the background, lighting units secured to the background for illuminating the filling, and feed wires carried by the stringer members and connected to the units to energize the same.

14. A bridle for aerial banners, comprising a device adapted for attachment to a tow cable, a rearwardly extending triangular shaped fabric member, a rigid normally vertical bar secured to the rear of the fabric member, and reinforcing members extending from the attaching device to the rear edge of the fabric member and secured to the fabric thereof by stitching extending the entire length of the reinforcing members, the cable attaching device being disposed opposite a point substantially one-third the distance from the top to the bottom of the bar.

15. In a bridle for aerial banners, a triangular fabric member, a tow ring at the front corner of the fabric member, a plurality of reinforcing members looped through the tow ring the reinforcing members radiating from the ring and extending to the rear edge of the fabric member and being stitched to it for their entire length, the rear edge of the fabric member and the rear ends of the reinforcing members being folded over and stitched to form a hem, and a rigid bar received in the hem.

16. A bridle for aerial banners having a tow ring, a rear rod, a plurality of divergent tension members extending from the ring to and about the rod, and a triangular fabric member stitched along its upper and lower edges to the upper and lower tension members and also stitched to the entire length of the other tension members, the tow ring being disposed opposite a point substantially one-third the distance from the top to the bottom of the bar.

17. An aerial banner adapted for towing behind an aircraft in a normally vertical plane and having a stabilizing device comprising a pendant, gravity-controlled element free to swing when the banner tilts, a rudder connected thereto and normally held thereby in a neutral position in the air-stream, and shifted by the gravity-controlled element when the banner is tilted to a position to engage the air-stream and exert an erecting torque.

18. An aerial banner having a normally vertical bar, a rudder pivotally secured to the bar, a pendant member carried by the bar, and connections between the pendant member and rudder for holding the rudder in neutral position when the bar is vertical and shifting it when the bar is tilted.

19. An aerial banner having a normally vertical rigid member and stabilizing means comprising an airfoil partaking of the tilting of the rigid member out of the vertical and normally exerting no lateral force on the member when it is vertical, the airfoil being pivoted to the member to swing about a substantially vertical axis, and an airfoil shifter carried by the member.

20. An aerial banner adapted for towing behind an aircraft and having a trailing lift contributing element in the form of a tapering air tube open at the front and rear, securing means for the tapering tube to insure that its lowermost position is parallel with the line of thrust while its upper portions are at a positive angle of incidence with the line of thrust to insure lift, and means to limit the horizontal angle through which the tube may swing relative to the direction of flight of the banner.

21. A trailing section for aerial banners comprising a leading, normally vertical spacer bar, a rear spacer bar coupled to the front spacer bar, a rearwardly converging air tube carried by the rear spacer bar with its upper inner surface presenting a greater angle of incidence than its lower inner surface whereby positive lift is contributed to the banner as it is drawn through the air.

22. A trailing section for aerial banners comprising a sheet of fabric reinforced by longitudinal stringers and secured at its front and rear ends to stretcher bars, and a lift producing tubular element secured to the rear bar to trail behind the same.

23. A trailing section for aerial banners such as claimed in claim 22, wherein the tubular element is of substantially elliptical cross section.

24. A trailing section for aerial banners such as claimed in claim 22, having straps connecting the reinforced fabric and the tubular element to limit the sway of the same about the rear bar.

25. A trailing section for aerial banners such as claimed in claim 22, wherein the portion of the tubular element which contributes the lift is placed substantially one-third of the distance below the top of the front spacer bar.

26. An aerial banner comprising a plurality of interchangeable sections of rectangular shape, each section comprising an opaque light absorbent fabric background occupying a portion of the area of the section and delineating a letter, a plurality of spaced parallel stringer members stitched to the background throughout the whole of their common extent, fasteners at the front of the stringers of each section, and co-operative fasteners at the rear of each preceding section.

27. A banner such as claimed in claim 26, having a filling of light reflecting fabric occupying the remaining portion of the area of the section and stitched to the stringer members and to the margins of the background.

28. A banner such as claimed in claim 26, having a filling of light reflecting fabric occupying the remaining portion of the area of the section and stitched to the stringer members and to the margins of the background, and electric lighting devices carried by the background portions of the section for illuminating the filling.

29. A banner such as claimed in claim 26, having a filling of light reflecting fabric occupying the remaining portion of the area of the section and stitched to the stringer members and to the margins of the background, current supply wires carried by certain of the stringer members, each connected in series with the corresponding wire of the next adjacent section, electric lamps carried by the background portions of the section, connected to the wires and disposed in a position for illuminating the filling, and reflectors intensifying said illumination and screening the lamps against observation when viewing the side of the banner in flight.

30. An aerial banner for night flying having a plurality of symbol carrying sections each having an opaque background, a light transmitting and reflecting fabric symbol carried by the background, and section carried means for illuminating the symbol from one side and for screening off stray light at angles of ordinary observation of the banner when in flight.

31. In combination, an aircraft, an electric power source carried by the aircraft and having output wires connected to substantially fixed contacts, a banner, electric wiring and lamps carried by the banner, a tow cable connecting the banner and the aircraft, cable winding mechanism, whereby the distance between the banner and the aircraft may be adjusted, and a cable carried member having contacts connected with the banner supported wiring and co-operable with the fixed contacts to complete the circuit when the cable is wound up to a predetermined extent.

32. The combination claimed in claim 31, wherein the fixed contacts are carried in a sleeve and the movable contacts are on a plug adapted to enter the sleeve.

33. The combination claimed in claim 31, having a signal circuit and co-operative fixed and movable contacts to close the signal circuit when the cable carried member is in position to close the circuit to the lamps.

34. An aircraft for banner towing having a power plant, a trailing tow cable, cable winding mechanism, and output contacts connected to the power plant and disposed adjacent the cable winding mechanism, contacts carried by the cable and co-operable with the output contacts, and circuit wires carried by the cable and connected to the latter mentioned contacts and to a current consuming load carried by the cable.

EDWARD G. WIEMER.